Nov. 29, 1938.　　　　S. J. MINK　　　　2,138,254
DENTAL CORRELATOR
Filed Dec. 27, 1935　　　4 Sheets-Sheet 1
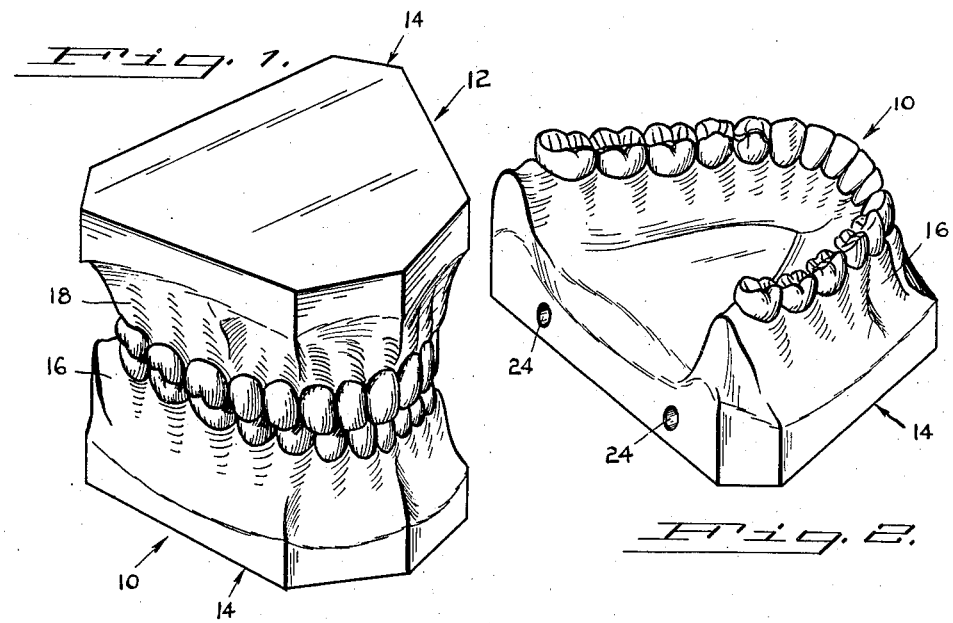
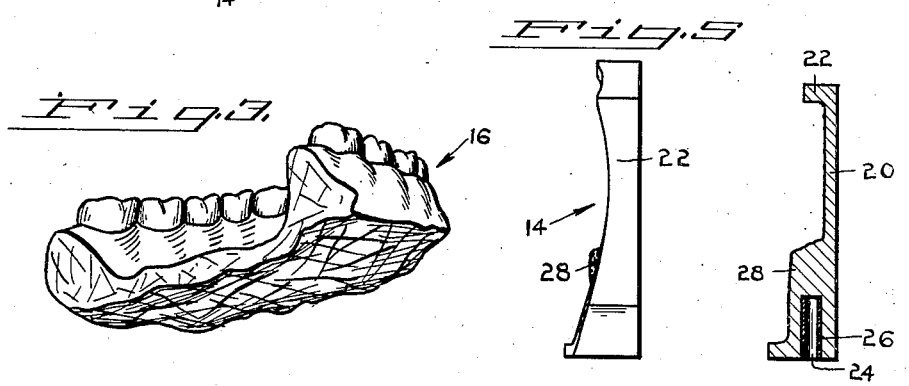
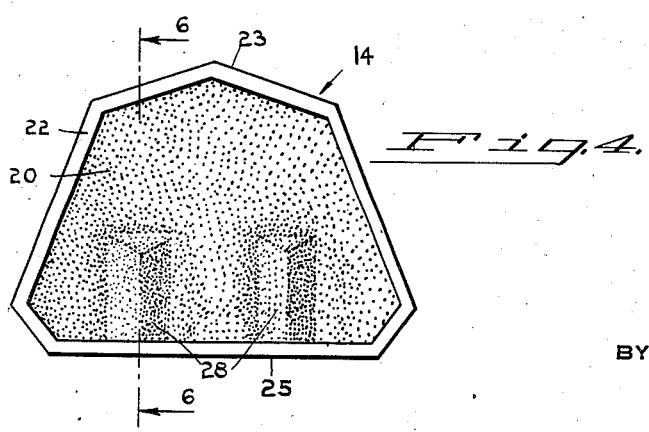
INVENTOR
SOLOMON J. MINK.
BY
ATTORNEY Nov. 29, 1938.   S. J. MINK   2,138,254
DENTAL CORRELATOR
Filed Dec. 27, 1935   4 Sheets-Sheet 2
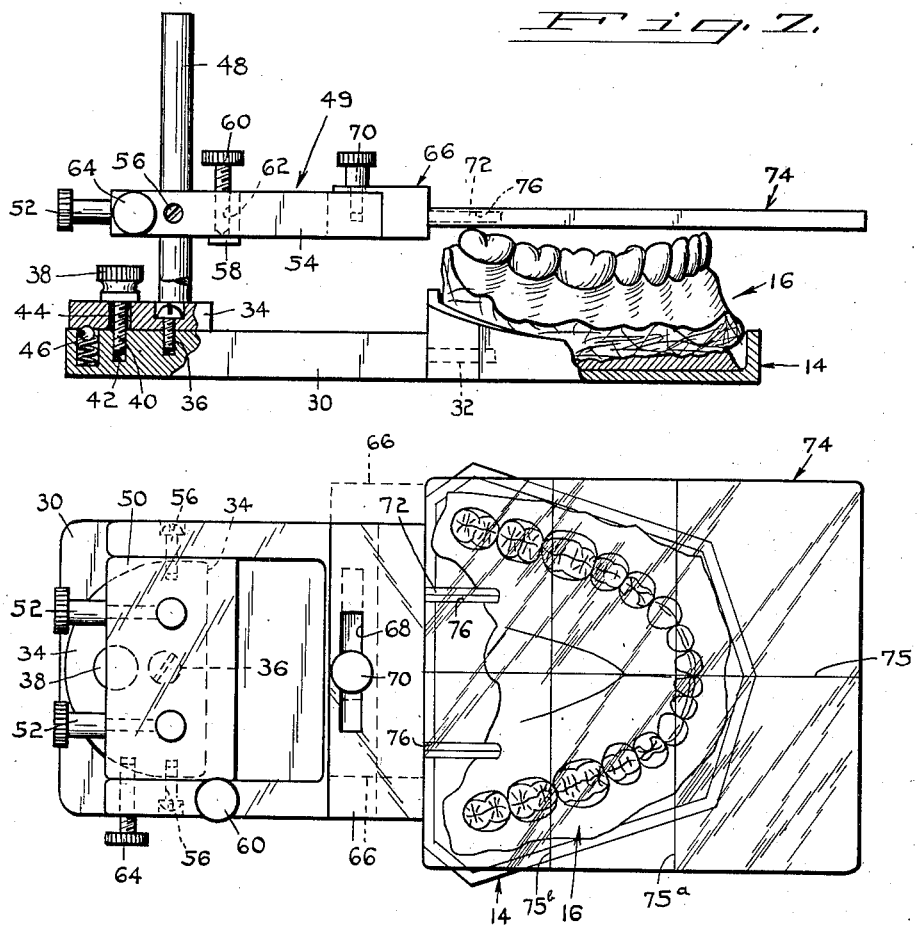
INVENTOR
SOLOMON J. MINK
BY
ATTORNEY

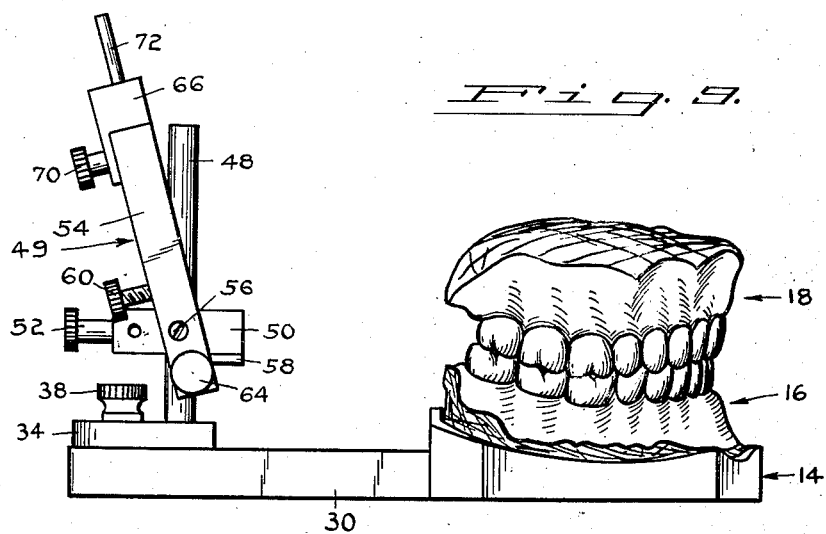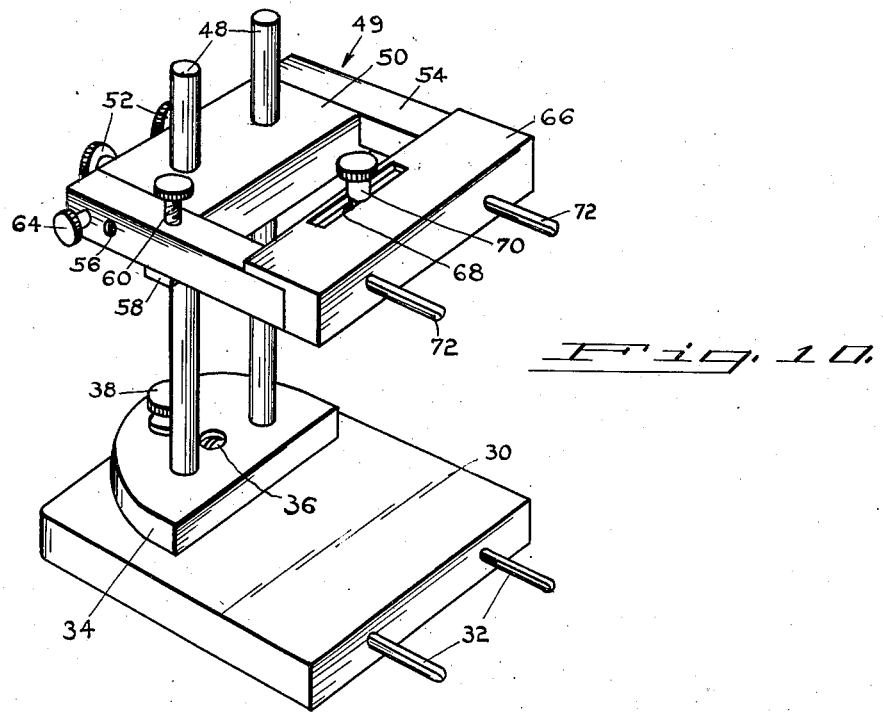

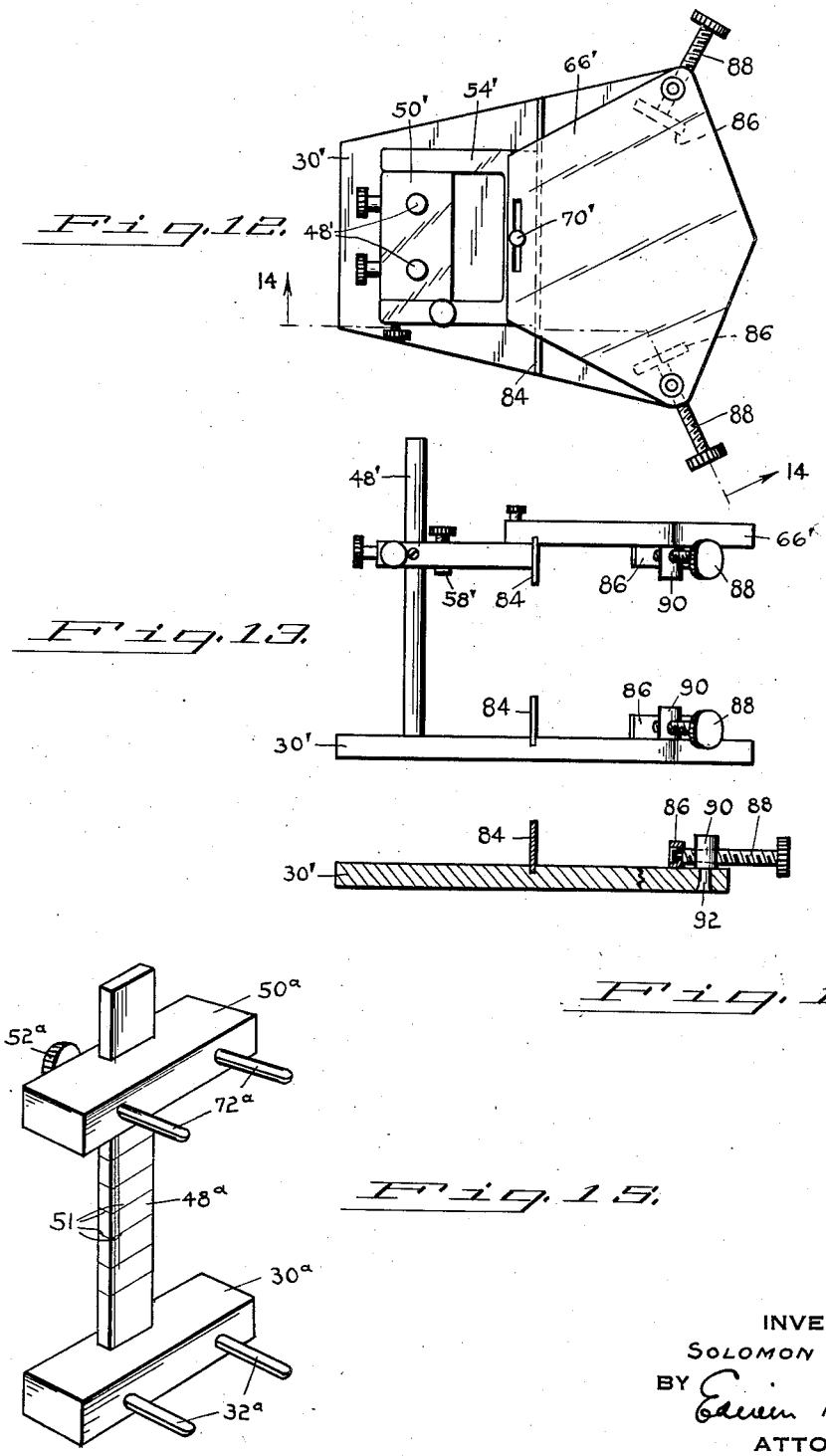

Patented Nov. 29, 1938

2,138,254

UNITED STATES PATENT OFFICE 2,138,254

DENTAL CORRELATOR

Solomon J. Mink, New York, N. Y.

Application December 27, 1935, Serial No. 56,389

6 Claims. (Cl. 18—5.7)

The present invention relates to the art of dentistry and, more particularly, to dental models and correlators for use in the practice of orthodontia, periodontia as well as in the practice of operative dentistry.

One of the objects of the invention is to simplify the method of making dental models or study casts of the teeth and gum tissue of the upper and lower jaws of the patient.

Another object of the invention is to provide well-articulated study models of refined or artistic appearance whereby not only to aid the practitioner in the study of a particular case, but also to enable the latter to explain to the patient in general the treatment necessary in the latter's case.

A further object of the invention is to provide preformed model bases which can be readily assembled with the casts of the patient's teeth and gum tissue in order to obtain with a minimum expenditure of detailed work on the part of the practitioner study models of good appearance.

Another object of the invention is the provision of a correlator to assist the practitioner in the proper assembly of the dental casts with the model bases in forming the study models.

A yet further object of the invention is generally to improve the art of dentistry with relation to means for securing definite diagnosis and prognosis in particular cases.

The above objects of the invention and other objects ancillary thereto will best be understood from the following description considered in connection with the accompanying drawings forming a part of the present specification.

In the drawings:

Fig. 1 is a perspective view of a dental model embodying the present invention;

Fig. 2 is a perspective view of the lower part of the dental model;

Fig. 3 is a perspective view of a dental cast as it appears before its assembly with a model base;

Fig. 4 is a top plan view of a model base;

Fig. 5 is an end view of the model base shown in Fig. 4;

Fig. 6 is a sectional view on the line 6—6 of Fig. 4;

Fig. 7 is a side view partly in elevation and partly in section of the correlator and the lower part of the model illustrating a step in the method of producing said part of the model;

Fig. 8 is a top plan view of Fig. 7;

Fig. 9 is a side view in elevation of the correlator and parts of the dental model illustrating another step in the method of producing the latter;

Fig. 10 is a perspective view of the correlator;

Fig. 11 is a perspective view illustrating a modification of a part of the correlator;

Fig. 12 is a top plan view of a correlator of modified form;

Fig. 13 is a side view in elevation of the correlator shown in Fig. 12;

Fig. 14 is a sectional view on the line 14—14 of Fig. 12;

Fig. 15 is a perspective view showing another modification of the correlator.

Referring to the drawings in detail and first to Fig. 1, the dental model of the present invention includes a lower member 10 and an upper member 12, each member including a model base 14 of the same construction. The lower member 10 includes the anatomic portion or cast 16 of the teeth and gum tissue of the lower jaw; the upper model 12 includes the anatomic portion or cast 18 of the upper teeth and gum tissue of the upper jaw and of the surface of the roof of the mouth.

The model bases are of the construction illustrated in detail in Figs. 4 to 6, inclusive, and are preferably made of plastic material, such as, plaster of Paris or artificial stone, although other substances, such as, metals or metal alloys or phenol-condensation products and other synthetic resins can be used. The base comprises a wall 20, having a peripheral flange 22 defining a recess within which an anatomic portion 16 or 18 of the model is positioned. The outer surfaces of the wall 20 are uniplanar and the model parts are assembled so that the outer surface of the wall 20 of the upper part is parallel to the outer surface of the wall 20 of the lower part. The outer surface of the anterior portion 23 of the flange 22 is convex to conform in general to the curvature of the anterior part of the anatomic portion of the cast. The outer posterior surface 25 of said flange is at right angles to the outer surface of the wall 20. Spaced recesses 24 are formed in the posterior portion of the base and are provided with metal sleeves or bushings 26. The bushings 26 may be conveniently provided in the recesses 24 by placing said bushings in their proper spaced relation in a mold and then molding the plastic material about said bushings in the mold. In forming the base, said bushings are covered with the material of which the bases are made, thus forming bosses 28 on the inner surface of the wall 20. The bases are, of course, made in different sizes and the number of sizes may vary, although I have found that three general sizes, namely, large, medium and small, are sufficient to meet the usual requirements for constructing the study models contemplated in accordance with the present invention.

The anatomic portion of the upper or lower part of the model is assembled with its companion model base 14 by inserting said anatomic portion within the recess defined by the flange 22 and securing said anatomic portion to its base by suitable plastic material which is also used to fill the spaces which may be left between the anatomic portion and the base and to obtain the model of artistic appearance. The anatomic portion may be formed of the same material as the base or may be of different material, and in order to improve the appearance of the model, either or both the anatomic portion and the base may be colored pink or any other suitable color.

In assembling the anatomic portion with its base and in properly relating the upper and lower parts of the model with respect to each other, there is utilized, in accordance with the present invention, a device which for convenience in reference may be termed a "correlator" which will now be described with particular reference to Figs. 7 to 10 of the drawings. The correlator comprises a base or primary lower plate 30 provided with pins 32 disposed in spaced relation at the front edge of the plate. Said pins 32 are of circular cross section and of slightly smaller diameter than that of the recesses 24 and are disposed the same distance from each other as are said recesses. Said pins are split longitudinally, as shown, to facilitate their insertion within the recesses 24 and it will be understood that the bushings 26 slidably fit over the pins with a rather close fit. A secondary lower plate 34 is pivotally supported on the upper surface of the plate 30 by means of a pivot screw 36. The plate 34 may be secured in desired angular relation with respect to the plate 30 by means of a set screw 38 which has a screw threaded stem 40 (Fig. 7) in engagement with a screw threaded recess 42 in the plate 30 and passes through an opening 44 in the plate 34, said opening being somewhat larger than the stem 40 to permit a limited rotation of the plate 34 with respect to the stem 40. If desired, a spring pressed ball-detent 46 may be provided to releasably hold the plate 34 in the desired position without tightening the set screw 38. Parallel upright posts 48 are carried by the plate 34 and an upper articulated plate 49 is supported by said posts. Said plate comprises a member 50 which is adjustable longitudinally of the posts 48 and for this purpose is provided with spaced apertures through which the posts extend with a somewhat close fit, set screws 52 extending into said apertures and serving to hold the member 50 in the desired position longitudinally of the posts. A U-shaped member 54 is pivotally connected to the side edges of the slidable member 50 by means of pivot screws 56. The member 54 is supported in horizontal position parallel to the primary lower plate 30 on the ends of a bar 58 secured to the lower surface of the member 50 and projecting beyond the sides of the latter. A screw 60 engaging a screw threaded aperture 62 in the member 54 and arranged so that its end may bear on a projecting portion of the bar 58, may be used to turn the U-shaped member 54 about the pivots 56 by rotating said screw into engagement with the bar 58. A set screw 64 is provided for securing the member 54 in fixed parallel relation to the plate 30. A bracket 66 is carried by the member 54 and, as here shown, is adjustable laterally of the latter, for which purpose said bracket is provided with an elongated slot 68 through which a set screw 70 extends for securing the bracket in adjusted position. Pins 72 of the same construction, size and spaced relation as pins 32 project from the forward edge of the bracket 66. The forward edges of the plate 30 and bracket 66 are preferably in the same vertical plane.

I will now describe more specifically the method of making the dental models of the present invention and the manner of utilizing the above described correlator for that purpose. First, as it is understood, the anatomic portions 16 and 18 of the models are obtained by casting or molding said anatomic portions from the wax or other impressions of the patient's teeth and gum tissue. These anatomic portions are formed without boxing and having the form illustrated generally in Fig. 3, which shows the anatomic portion of the lower jaw, and in Fig. 9, which shows the form of the anatomic portion of the upper jaw. Having produced the anatomic portions of the models, the next step is to assemble these portions respectively with their companion model bases. In accomplishing this, a model base 14, for the lower part of the model, is attached to the correlator by fitting the bushings 26 over the pins 32 and positioning the model base 14 with its posterior edge in engagement with the front edge of the plate 30. A suitable quantity of plastic material is then placed within the recess in the base and the anatomic portion 16 is placed on said plastic material in proper relation within the recess.

Before allowing the anatomic portion 16 to be permanently attached to its base, it is first necessary to position the latter so that the occlusal surfaces of the teeth are in the proper plane at the proper distance above the outer surface of the wall 20 of the base 14. For this purpose, there is utilized what I term a "correlator-plane" 74, which is preferably transparent and may be made of Celluloid, glass or other suitable material. The correlator-plane 74 is provided with recesses 76 in its posterior edge, spaced and otherwise constructed to fit over the pins 72 on the bracket 66. The correlator-plane 74 is set so that the distance between its lower surface and the lower surface of the wall 20 of the base 14 determines the distance between the occlusal plane of the teeth of the anatomic portion 16 and the lower surface of said wall 20. This distance may vary, but preferably for the purpose of obtaining a model of good proportions and artistic appearance, it should be one and one half times the distance between the free edge of the cuspid tooth to the reflection of the gum. This distance can be readily obtained by means of proportional dividers, by measuring the distance from the free edge of the cuspid to the reflection of the gum thereby, when the dividers are properly set automatically obtaining the correct over-all distance, that is, the distance from the outer surface of the base to the plane of occlusion. The correlator-plane 74 is set in the correct position thus determined, and to facilitate this, the posts 48 may be provided with graduations or indications (not shown). Having thus set the correlator-plane, the anatomic portion 16 of the model is adjusted with respect to its height and centered, with respect to the center line 75 and the cross lines 75a and 75b in the correlator-plane, more plaster being added, if necessary to bring said anatomic portion to the correct position, after which the plaster is allowed to set to firmly secure said anatomic portion in that position. Instead of the correlator-plane 74, there may be used the correlator member, illustrated in Fig. 11. Said member may be transparent and comprises a plate 78 carrying a plurality of radially extending fingers 80 disposed in the same horizontal plane as the plate 78, for determining the occlusal plane of the teeth of the anatomic portion 16. Said fingers 80 may be adjustable in length by means of the sleeve elements 81 slidably carried thereby. Preferably the outer fingers 80 are pivotally secured in position by means of pivot screws 80a. The plate 78 is provided with recesses 82 which are adapted to receive the pins 76 for attaching said plate to the bracket 66. After the anatomic portion 16 is thus assembled, the correlator-plane 74, or the member 78, as the case may be, is removed from the pins 76 and the member 54 may be moved to the position illustrated in Fig. 9 to permit access to the posterior portions of the lower model part for observation thereof or for the addition of plaster.

In performing the next step of the method, as illustrated in Fig. 9, the anatomic portion 18 of the upper part of the model is placed in position with the teeth thereof in their proper occlusal relation to the teeth of the anatomic portion 16 of the lower part of the mouth, small quantities of sticky wax or other adhesive having been first placed at the tips of the teeth of the lower or upper anatomic portions so that said portion 18 is held in the position illustrated. A suitable quantity of plastic is then placed on the roof of this anatomic portion to secure the base thereto. The upper articulated plate 49 is then moved upwardly through a distance substantially equal to the over-all distance previously determined for the lower part of the model, and is secured in position by the set screws 52. A model base 14 is then attached to said upper plate by sliding the bushings thereof on the pins 72 until the posterior edge of the base engages the forward edge of the bracket 66. After the plaster is set, so that the anatomic portion is fixed to its base, the model including both the upper and lower parts thereof are removed from the correlator by slipping the parts thereof off the pins. Finally the spaces between the anatomic portions and other bases are filled with soft-mix plaster and it is worked around the anatomic portions in continuity with the gum tissue at the gum reflection to obtain a model of good appearance. It is well to moisten the bases 14 just prior to assembling the anatomic portions therewith, as above described, as this treatment improves the adhesion between the plaster and the bases and anatomic portions. The sticky wax may be removed from the models by the application of warm water which melts the wax.

Figs. 12 to 14 illustrate a modification of the correlator. As here shown, the correlator is similar in construction to the correlator illustrated in Fig. 10 and similar parts are designated by the same reference numerals with primes added. As here shown, however, the secondary lower plate 34 has been omitted and the posts 48' are carried directly by the plate 30'. Also in lieu of the pins 32 and 72 for attaching the model bases to the correlator, there are provided clamping elements by which the model bases may be removably secured in position thereby making it unnecessary to provide the correlator bases with recesses or bushings. The clamps on the lower plate 30' and the upper bracket 66' are of the same construction, each clamp comprises a vertically disposed stationary clamping member 84 and movable clamping members 86 disposed at the front corners of said plate and bracket, respectively. The movable clamping member 86 is carried by an operating screw 88 which is in threaded engagement with a block 90 having a stem 92 rotatably mounted in the base 30' or bracket 66'. Thus, base 14 may be clamped in position on the plate 30' or on the bracket 66' by positioning the posterior edge of the base in engagement with the stationary clamping member 84 and then tightening the movable clamping members 86 in engagement with the outer surface of the flange 22 of the base.

Fig. 15 illustrates another form of correlator which may be used in accordance with the present invention for assembling the anatomic portions with their bases and for correlating the upper part of the model with respect to the lower part thereof, as described above in connection with the correlator illustrated in Fig. 10. As here shown, the correator comprises a lower plate 30a carrying a single upright 48a of non-circular cross section, although said cross section may be circular, if desired. Spaced pins 32a are carried by said plate 30a. An upper plate 50a, carrying spaced pins 72a, is slidably mounted on the post 48a and may be secured in desired position by the set screw 52a. The post 48a may carry graduations 51.

The model bases made in contemplation of the present invention may be provided with or without the pin recesses. When the model bases without pin recesses are to be used with correlators having pins for attaching the bases to the correlator, such recesses may be formed in such bases by drilling holes in the correct position at the posterior edge thereof.

Thus, it is seen that the dental models, model bases and correlators, and the method of making the dental models, all as herein shown and described, are well adapted to accomplish the several objects of the present invention. It will be understood, however, that certain changes in the construction of the dental models, model bases and correlators, as well as in the steps of the method, may be made without departing from the present invention. Therefore, I do not wish to be limited to the precise constructions and operations herein shown or described, except as may be required by the appended claims considered with reference to the prior art.

Having now described my invention, what I claim and desire to secure by Letters Patent is:

1. A dental correlator comprising a lower plate, a post upstanding therefrom, an upper plate slidably positioned on said post, and pins projecting from the forward edges of said plates.

2. A dental correlator comprising a primary lower plate, a secondary lower plate pivotally mounted on said first mentioned plate, an upright post carried by said secondary plate, an articulated plate positioned above said primary plate in movable relation thereto, said articulated plate comprising a member slidably engaging said post, and a second member pivotally connected to said post-engaging member, and means for holding said pivoted member in a plane parallel to the plane of said primary lower plate.

3. A dental correlator comprising a lower plate, a post upstanding therefrom, an articulated plate positioned above said lower plate in movable relation thereto, and pins projecting from the forward edges of said plates.

4. A dental correlator comprising a lower plate, a post upstanding therefrom, an articulated plate positioned above said lower plate in movable relation thereto, said articulated plate comprising a member slidably engaging said post, and a second member pivotally connected to said post-engaging member, and pins projecting from the forward edges of said plates.

5. A dental correlator comprising a lower plate, a post upstanding therefrom, an articulated plate positioned above said lower plate in movable relation thereto, said articulated plate comprising a member slidably engaging said post, and a second member pivotally connected to said post-engaging member, pins projecting from the forward edges of said plates and means for releasably holding said pivoted member in a plane parallel to the plane of said lower plate.

6. A dental correlator comprising a primary lower plate, a secondary lower plate pivotally mounted on said first mentioned plate, an upright post carried by said secondary plate, an articulated plate positioned above said primary plate in movable relation thereto, said articulated plate comprising a member slidably engaging said post, and a second member pivotally connected to said post-engaging member, means for holding said pivoted member in a plane parallel to the plane of said primary lower plate, and pins projecting from the forward edges of said primary lower plate and said second member of said articulated plate.

SOLOMON J. MINK.